US006294950B1

(12) United States Patent
Lee et al.

(10) Patent No.: US 6,294,950 B1
(45) Date of Patent: Sep. 25, 2001

(54) CHARGE PUMP CIRCUIT HAVING VARIABLE OSCILLATION PERIOD

(75) Inventors: Jae-Goo Lee, Kwangmyung; Young-Hyun Jun, Seoul, both of (KR)

(73) Assignee: Hyundai Electronics Industries Co., Ltd., Ichon-shi (KR)

(*) Notice: Subject to any disclaimer, the term of this patent is extended or adjusted under 35 U.S.C. 154(b) by 0 days.

(21) Appl. No.: 09/472,163

(22) Filed: Dec. 27, 1999

(30) Foreign Application Priority Data

Jul. 28, 1999 (KR) .................................................. 99-30898

(51) Int. Cl.[7] ...................................................... G05F 1/10
(52) U.S. Cl. ............................................. 327/539; 327/102
(58) Field of Search .................................... 327/534, 535, 327/536, 537, 102

(56) References Cited

U.S. PATENT DOCUMENTS

| 4,794,278 | * | 12/1988 | Vajdic | 327/535 |
| 5,258,662 | * | 11/1993 | Shovmand | 327/535 |
| 5,394,026 | * | 2/1995 | Yu et al. | 327/536 |
| 5,532,915 | * | 7/1996 | Pantelakis et al. | 363/60 |
| 5,561,385 | * | 10/1996 | Choi | 327/536 |
| 5,952,872 | * | 9/1999 | Hur | 327/535 |
| 6,031,411 | * | 2/2000 | Tsay et al. | 327/536 |

* cited by examiner

*Primary Examiner*—Terry D. Cunningham
(74) *Attorney, Agent, or Firm*—Fleshner & Kim, LLP (57) ABSTRACT

The present invention relates to a charge pump circuit which can vary an oscillation frequency for charge pumping in proportion to a charge consumption amount. The charge pump circuit includes: a voltage divider dividing a boosting voltage to a predetermined level; a voltage level sensing unit sensing a voltage difference between a divided voltage outputted from the voltage divider and a reference voltage, and outputting a control voltage corresponding to the sensed voltage difference; an oscillator circuit varying an oscillation frequency in accordance with the control voltage outputted from the voltage level sensing unit; and a charge pump performing a pumping operation in accordance with the output from the oscillator circuit, and outputting a boosting voltage.

16 Claims, 6 Drawing Sheets

CHARGE PUMP CIRCUIT HAVING VARIABLE OSCILLATION PERIOD

BACKGROUND OF THE INVENTION

1. Field of the Invention

The present invention relates to a boosting circuit for a semiconductor memory device, and in particular to a charge pump circuit which can vary an oscillation period in proportion to charge consumption of a charge pump.

2. Description of the Background Art

Figure 1:
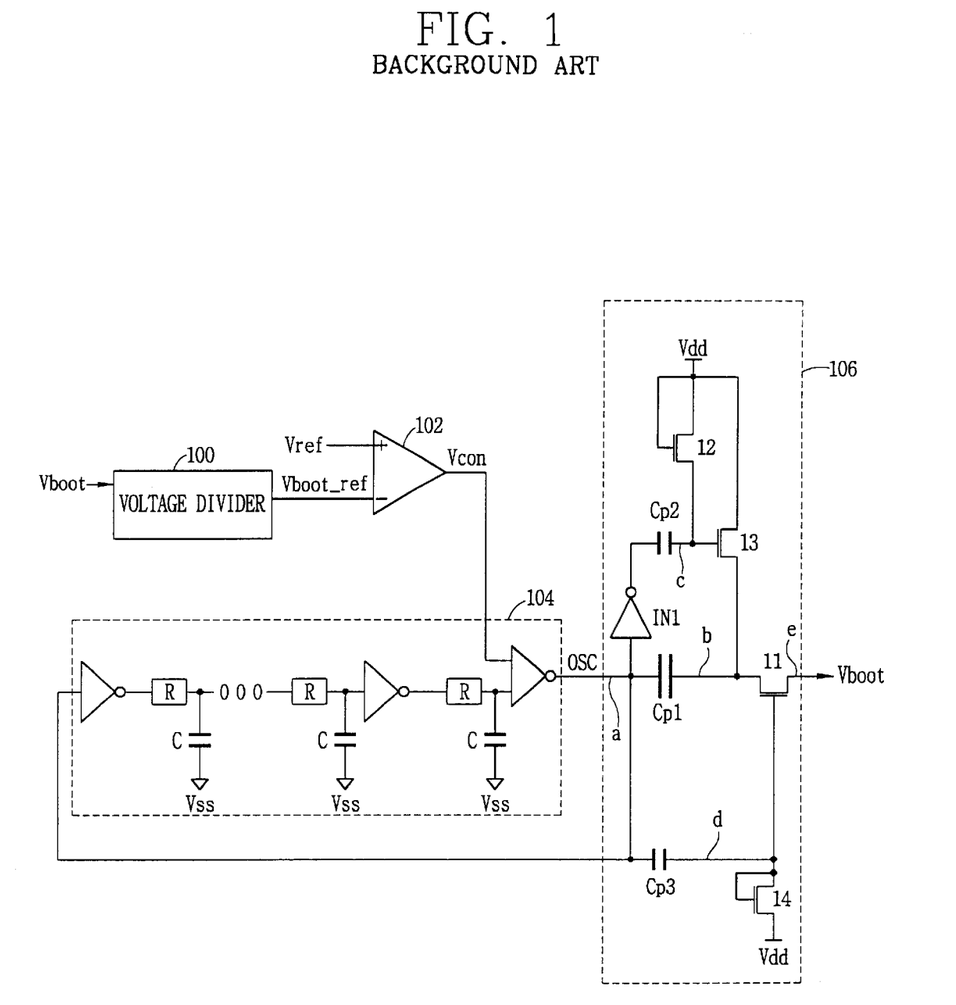
FIG. 1 is a constitutional diagram illustrating a conventional charge pump circuit having a single oscillation period.

FIG. 1 illustrates a conventional charge pump circuit having a single oscillation period. As shown therein, the conventional charge pump circuit having the single oscillation period includes: a voltage divider 100 dividing a boosting voltage Vboot to a predetermined level; a comparator 102 comparing a divided voltage Vdiv outputted from the voltage divider 100 with a reference voltage Vref, and outputting a control voltage Vcon; a ring oscillator 104 outputting a pulse signal OSC having a fixed oscillation period in accordance with the control voltage Vcon outputted from the comparator 102; and a charge pump 106 performing a pumping operation in accordance with the pulse signal OSC outputted from the oscillator 104, and outputting a boosting voltage Vboot.

The ring oscillator 104 includes a plurality of inverters composing a ring. An RC integral circuit is inserted between the inverters, respectively. In addition, a last inverter of the plurality of inverters is a clocked inverter controlled by the control voltage Vcon of the comparator 102.

The charge pump 106 includes a first pumping capacitor Cp1 connected between an input node (a) and a first node (b); an output transistor 11 connected between the first node (b) and an output node (e), and transmitting a voltage of the first pumping capacitor Cp1 to the output node (e); an inverter IN1 and a second pumping capacitor Cp2 which are sequentially connected between the input node (a) and a second node (c); a diode type n-channel MOSFET 12 connected between a power supply voltage Vdd and the first node (b), and precharging the first pumping capacitor Cp1; a third pumping capacitor Cp3 connected between the input node (a) and a third node (d); and a diode type n-channel MOSFET 14 connected between a common node of the third node (d) and the output transistor 11 and the power supply voltage. Here, the first pumping capacitor Cp1 has a considerably large size, as compared with the second and third pumping capacitors Cp2, Cp3 which have an identical size.

The operation of the thusly-constituted charge pump circuit having the single oscillation period will now be described with reference to the accompanying drawings.

Figure 4A:
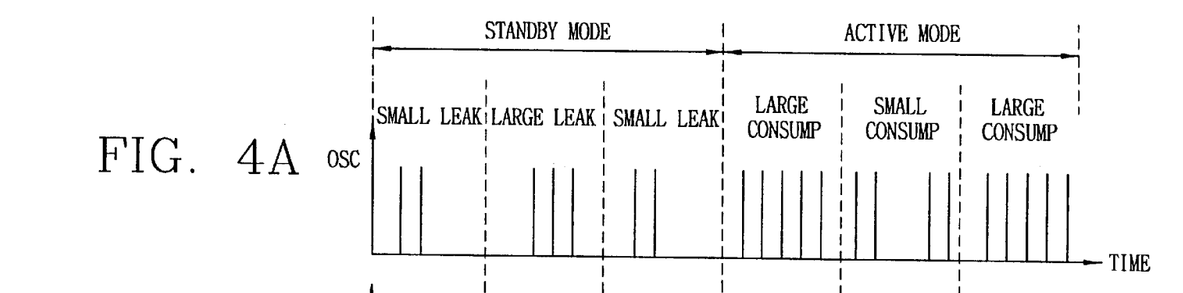
FIG. 4 illustrates an example of a pulse signal in a standby mode and an active mode in the conventional art and the present invention.

When the power supply voltage Vdd is applied, and the reference voltage Vref is inputted, a high-level control signal Vcon is outputted from the comparator 102, thereby enabling the ring oscillator 104. The enabled ring oscillator 104 outputs the pulse signal OSC having a fixed oscillation frequency. FIG. 4A illustrates an example of the pulse signal OSC outputted in a standby mode and an active mode in the conventional charge pump circuit having the single oscillation period. Accordingly, the charge pump 106 performs the pumping operation pursuant to the level of the pulse signal OSC outputted from the ring oscillator 104, thereby outputting the boosting voltage Vboot having a predetermined level.

The pumping operation of the charge pump will now be explained in more detail.

In case the pulse signal PSC is at a high level, the second pumping capacitor Cp2 is charged up with a voltage Vdd–Vth2 dropped by a threshold voltage Vth2 of the diode type n-channel MOSFET 12. When the pulse signal PSC is at a low level, the third pumping capacitor Cp3 is charged up with a voltage Vdd–Vth3 dropped by a threshold voltage Vth3 of the diode type n-channel MOSFET 14. Here, the voltage of the second and third nodes (c), (d) is Vdd–Vth2 and Vdd–Vth3, respectively.

Therefore, when it is presumed that the pulse signal OSC outputted from the ring oscillator 104 is at a low level, the second pumping capacitor Cp2 charged up at the Vdd–Vth2 level in a previous cycle carries out the pumping operation in accordance with the pulse signal OSC inverted in the inverter IN1, and thus the voltage of the Vdd–Vth1 level dropped by a threshold voltage Vth1 of the n-channel MOSFET 13 is precharged in the first node (b).

Thereafter, when the pulse signal OSC is transited from low to high, the first and third pumping capacitors Cp1, Cp3 perform the charge pumping operation, and the second pumping capacitor Cp2 is re-charged up at the Vdd–Vth2 level by the diode type n-channel MOSFET 12. As a result, the output transistor 11 is turned on by the voltage of the third node (d), and thus the voltage of the first node (b) boosted in the first pumping capacitor Cp1 is outputted into the output node (e) via the output transistor 11.

Accordingly, the voltage divider 100 divides the boosting voltage Vboot outputted from the charge pump 106, and the comparator 102 compares the divided voltage Vdiv outputted from the voltage divider 100 with the reference voltage Vref, and judges whether to keep performing the pumping operation of the charge pump 106. That is, when the divided voltage Vdiv is smaller than the reference voltage Vref, the ring oscillator 104 is enabled, thereby keep performing the pumping operation of the charge pump 106. In case the divided voltage Vdiv is greater than the reference voltage Vref, the ring oscillator 104 is disabled, thereby stopping the pumping operation of the charge pump 106.

Figure 5:
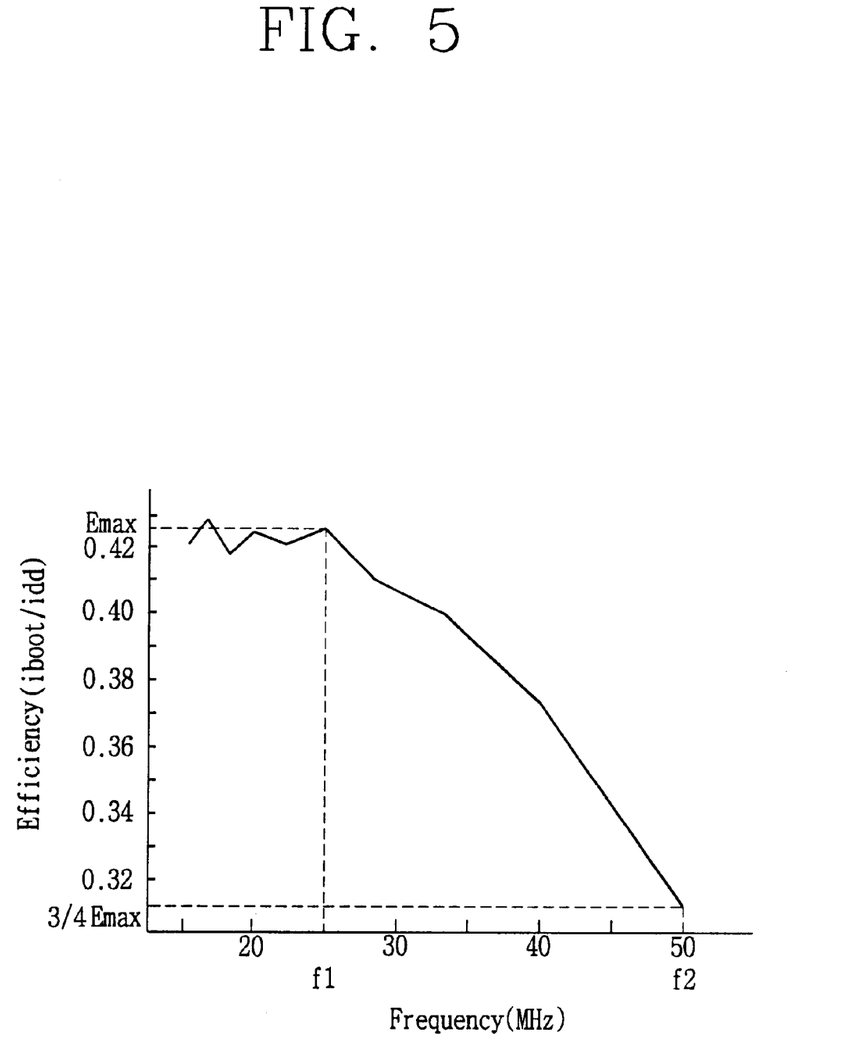
FIG. 5 illustrates a simulation result of charge pumping efficiency in accordance with an oscillation frequency in the conventional art and the present invention.

However, in the conventional charge pump circuit having the single oscillation period, referring to FIG. 5, an oscillation frequency of the ring oscillator 104 is fixed to have a value f1 in order to maximally maintain the pumping efficiency Emax of the charge pump 106 both in the active mode and the standby mode. Accordingly, the conventional charge pump circuit having the single oscillation period has a disadvantage in that power consumption is increased in the standby mode.

In addition, in the conventional charge pump circuit having the single oscillation period, the first pumping capacitance Cp1 of the charge pump 106 must be maintained to be considerably large in order to satisfy a maximal charge consumption demand (maximal pumping efficiency). Consequently, the conventional charge pump circuit having the single oscillation period has another disadvantage in that a size of the charge pump 106 is increased by the first pumping capacitor Cp1.

Figure 2:
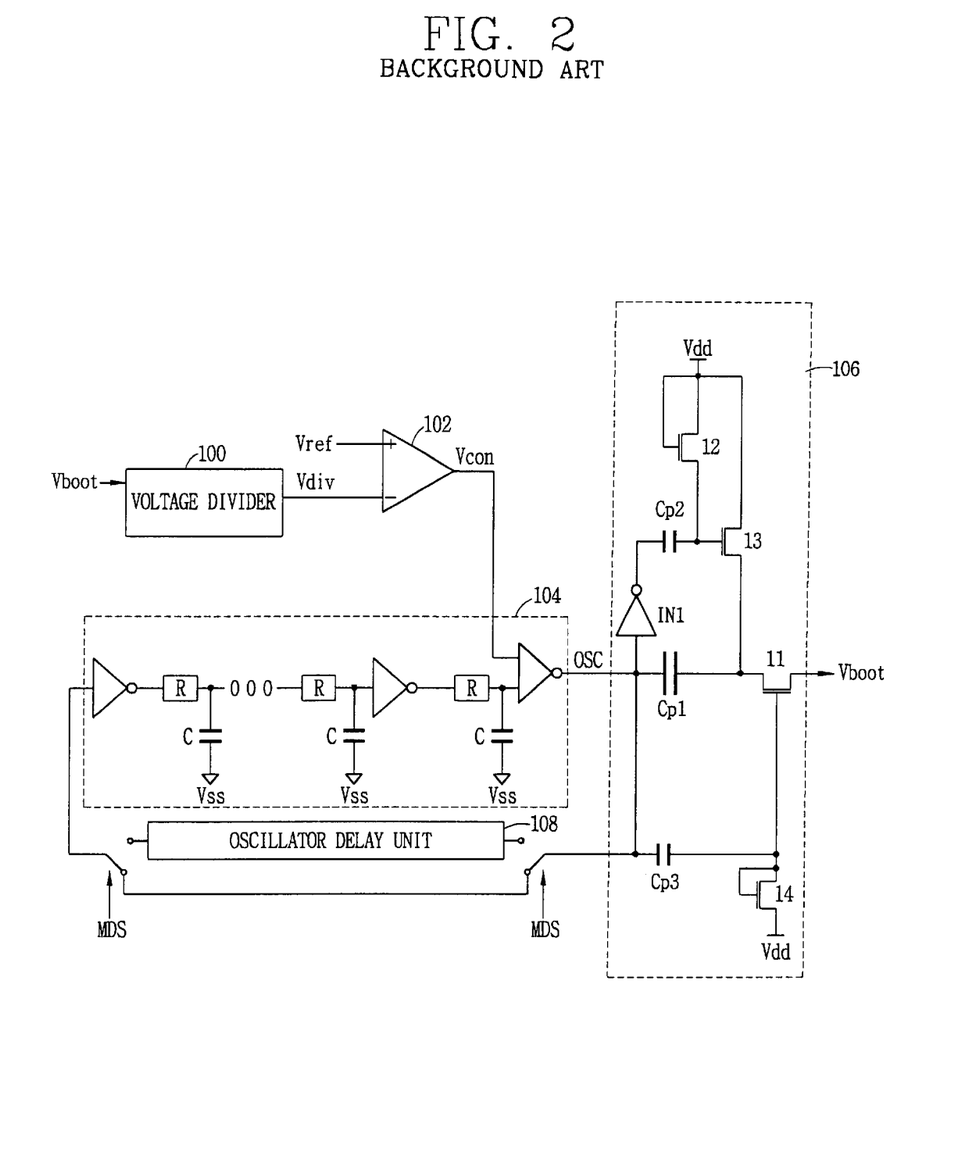
FIG. 2 is a constitutional diagram illustrating a conventional charge pump circuit having a dual oscillation period.

FIG. 2 illustrates a conventional charge pump circuit having a dual oscillation period. As shown therein, the charge pump circuit having the dual oscillation period further includes an oscillator delay unit 108, as compared with the conventional charge pump circuit having the single oscillation period. The oscillator delay unit 108 is constituted identically to the ring oscillator 104, and connected to or disconnected from the ring oscillator 104 by first and second switches SW1, SW2.

Figure 4B:
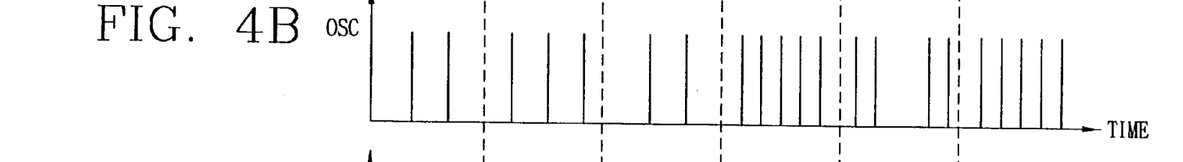

Accordingly, the first and second switches SW1, SW2 are operated pursuant to a mode discriminating signal MDS, and connect the oscillator delay unit 108 to the ring oscillator 104 in the active mode, and disconnect the oscillator delay unit 108 therefrom in the standby mode. As a result, the oscillation frequency of the pulse signal OSC outputted from the ring oscillator 104 is fixed to have a different value in the active mode and the standby mode. That is to say, the oscillation frequency of the ring oscillator 104 is fixed to be a value f1 (high frequency) for satisfying the maximal charge consumption demand in the active mode, and to be a value (low frequency) for satisfying low charge consumption in the standby mode. FIG. 4B illustrates an example of the pulse signal OSC outputted in the standby mode and the active mode in the conventional charge pump circuit having the dual oscillation period.

However, in the conventional charge pump circuit having the dual oscillation period, the capacitance of the first pumping capacitor Cp1 must satisfy the maximal charge consumption demand in the active mode, identically to the conventional charge pump circuit having the single oscillation period. Therefore, as compared with the charge pump circuit having the single oscillation period, the charge pump circuit having the dual oscillation period has an advantage in that power consumption can be reduced. However, a size of the charge pump circuit is still increased due to the first pumping capacitor Cp1.

Also, the charge pump circuit having the dual oscillation period may drop the boosting voltage level due to unexpected charge consumption (current leakage) in the standby mode. Consequently, in case the operation of the semiconductor memory device is changed from the standby mode to the active mode, there is a disadvantage in that the pumping voltage cannot be rapidly restored to the boosting voltage level.

SUMMARY OF THE INVENTION

Accordingly, it is a primary object of the present invention to provide a charge pump circuit which can vary an oscillation frequency in proportion to charge consumption of a charge pump.

It is another object of the present invention to provide a charge pump circuit which can reduce a size of a charge pump and power consumption.

In order to achieve the above-described objects of the present invention, there is provided a charge pump circuit having a variable oscillation period including: a voltage divider dividing a boosting voltage to a predetermined level; a voltage level sensing unit sensing a voltage difference between a divided voltage outputted from the voltage divider and a reference voltage, and outputting a control voltage corresponding to the sensed voltage difference; an oscillator circuit varying an oscillation frequency for charge pumping in accordance with the control voltage outputted from the voltage level sensing unit; and a charge pump performing a pumping operation in accordance with an output from the oscillator circuit, and outputting a boosting voltage.

In addition, in order to achieve the above-described objects of the present invention, there is provided an oscillator circuit including: a current source generating a reference current in accordance with a control voltage outputted from a voltage level sensing unit; a current mirror unit current-mirroring the reference current outputted from the current source, and outputting a plurality of source currents; a ring oscillator connected between the current mirror unit and a ground, and varying an oscillation frequency in accordance with the source currents; and an output buffer buffering an output from the ring oscillator, and outputting a pulse signal for a pumping operation of a charge pump.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

Figure 3:
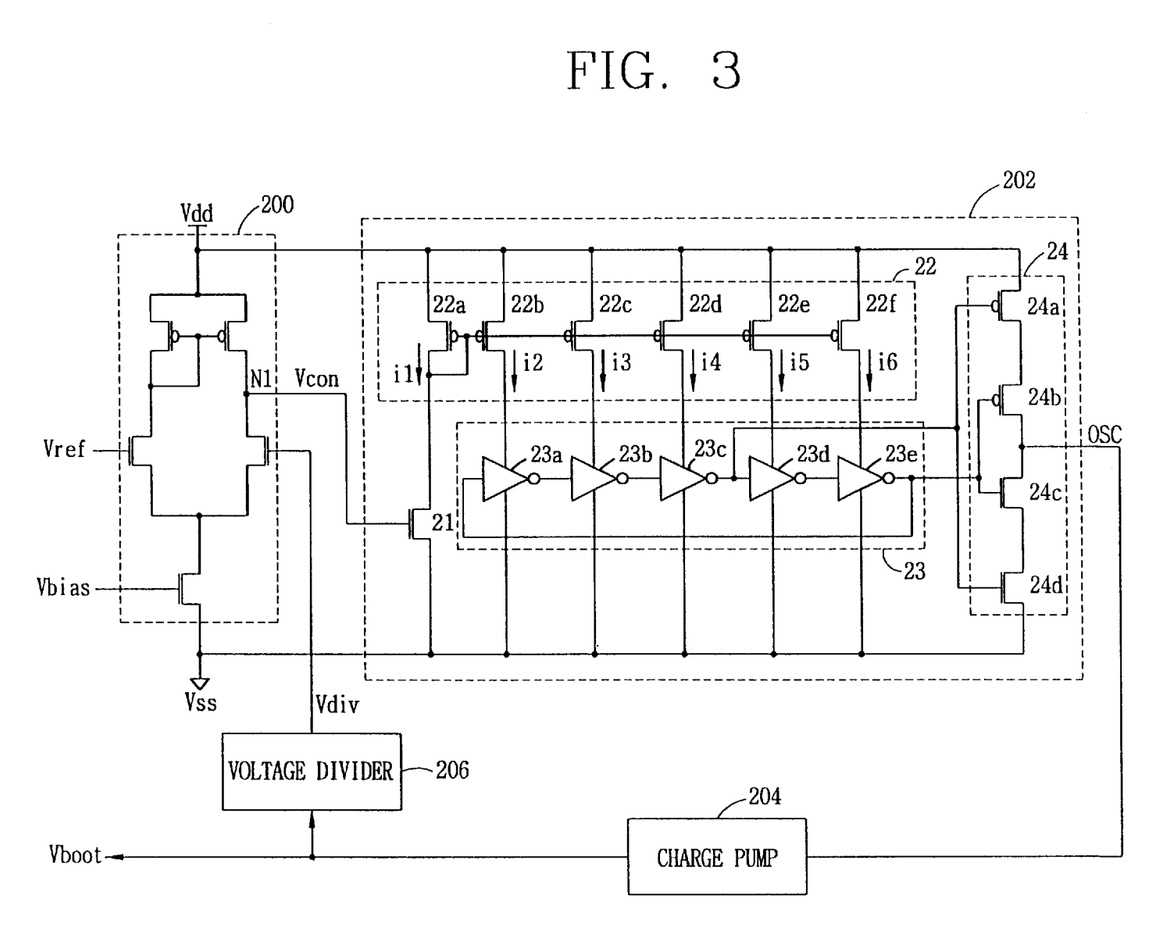
FIG. 3 is a constitutional diagram illustrating a charge pump circuit having a variable oscillation period in accordance with the present invention.

FIG. 3 illustrates a charge pump circuit having a variable oscillation period in accordance with the present invention. As shown therein, the charge pump circuit having the variable oscillation period includes a voltage level sensing unit 200, an oscillator circuit 202, a charge pump 204, and a voltage divider 206. Here, the charge pump 204 and the voltage divider 206 are identical in constitution and operation to the conventional art.

The voltage level sensing unit 200 consists of a differential amplifier, and senses a voltage difference between a reference voltage Vref and a boosting voltage Vboot, in more detail, a voltage difference between the reference voltage Vref and a divided voltage Vdiv.

The voltage level sensing unit 200 includes: a current source 21 generating a reference current i1 in accordance with a control voltage Vcon; a current mirror unit 22 current-mirroring the reference current i1, and outputting source currents i2~i6; a ring oscillator 23 varying an oscillation frequency of a pulse signal OSC in accordance with the source currents i2~i6; and an output buffer 24 buffering an output from the ring oscillator 23, and outputting the pulse signal OSC.

The current source 21 is an n-channel MOSFET, and the current mirror unit 22 consists of six identical p-channel MOSFETs 22a~22f. A drain of the p-channel MOSFET 22a is connected to the current source 21, and the other p-channel MOSFETs 22b~22f are respectively connected to a power source terminal of the ring oscillator 23. Here, the p-channel MOSFET 22a decides an amount of a driving current of the p-channel MOSFETs 22b~22f. A size of the p-channel MOSFET 22a and the p-channel MOSFETs 22b~22f is determined in accordance with a ratio of the reference current i1 and the source currents i2~i6 respectively passed through the p-channel MOSFETs 22a~22f. According to the present invention, the p-channel MOSFETs 22a~22f have an identical size. In addition, the ring oscillator 23 is connected between the current mirror unit 22 and a ground Vss, and consists of a plurality of inverters 23a~23e composing a ring.

The output buffer 24 includes p-channel MOSFETs 24a, 24b and n-channel MOSFETs which are connected in series between the power supply voltage Vdd and the ground Vss. Here, gates of the p-channel MOSFET 24a and the n-channel MOSFET 24d receive an output from the inverter 21c, and gates of the p-channel MOSFET 26b and the n-channel MOSFET 24c receive an output from the inverter 21e.

The operation of the charge pump circuit having the variable oscillation period in accordance with the present invention will now be described.

Figure 4C:
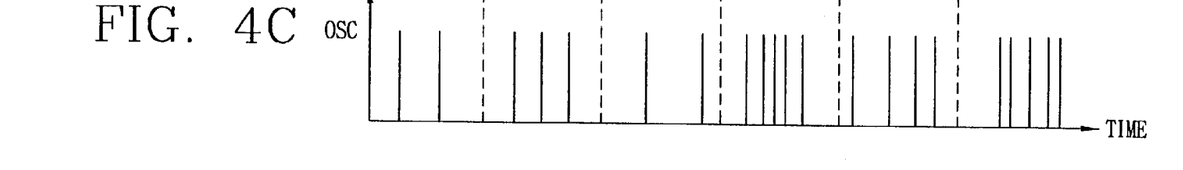

The boosting voltage Vpp outputted from the charge pump 204 is divided into a predetermined level in the voltage divider 206, identically to the conventional art, and inputted to the voltage level sensing unit 200. The voltage level sensing unit 200 amplifies a difference between the reference voltage Vref and the divided voltage Vdiv of the voltage divider 206, and outputs the control voltage corresponding to the voltage difference to the current source 21 of the oscillator circuit 202. Here, the reference current i1 flowing through the p-channel MOSFET 22a of the current mirror unit 22 is determined by the current source 21. The p-channel MOSFETs 22b~22f current-mirror the reference current i1, and output the source currents i2~i6. Accordingly, the ring oscillator 23 varies the oscillation frequency pursuant to the source currents i2~i6 outputted from the current mirror unit 22. The output buffer 24 buffers an output from the inverter 23f in accordance with the output from the inverter 23c, and outputs the pulse signal OSC for driving the charge pump 204. FIG. 4C illustrates an example of the pulse signal OSC outputted in a standby mode and an active mode in accordance with the present invention.

In the active mode, when the divided voltage Vdiv is lower than the reference voltage Vref due to the large charge consumption, the differential amplifier 200 outputs the control voltage at a high level through an output node N1, thereby turning on the current source 21. As a result, a resistance of the current source 21 is decreased, and thus the reference current i1 flowing through the p-channel MOSFET 22a of the current mirror unit 22 is increased. In case the reference current i1 is increased, the source currents i2~i6 flowing through the p-channel MOSFETs 22b~22f are also increased due to the current-mirroring. Accordingly, the inverters 23a~23f of the ring oscillator 23 are operated at a high speed due to the increase of the source currents i2~i6, and thus the oscillation frequency of the ring oscillator 23 is increased.

Thereafter, when the difference between the reference voltage Vref and the divided voltage Vdiv is reduced by the pumping operation of the charge pump 204, the resistance of the current source 21 is increased by the control voltage Vcon outputted from the differential amplifier 200, and thus the reference current i1 and the source currents i2~i6 are decreased. As a result, the inverters 23a~23f of the ring oscillator 23 are operated at a low speed, and thus the oscillation frequency of the ring oscillator 23 is reduced. Therefore, the oscillation frequency is consecutively varied in accordance with the difference between the reference voltage Vref and the divided voltage Vdiv.

To the contrary, in the standby mode, when the divided voltage Vdiv becomes greater than the reference voltage Vref, the differential amplifier 200 outputs the control voltage Vcon at a low level through the output node N1. Consequently, the current source 21 is turned off (cut-off state), and thus the reference current i1 does not flow through the p-channel MOSFET 21a, and the source currents i2~i6 do not flow through the p-channel MOSFETs 22b~22f. Accordingly, the ring oscillator 23 does not output the pulse signal OSC until the charge of the boosting voltage Vboot is leaked. Then, in case the charge is leaked and the boosting voltage Vboot becomes lower than the reference voltage Vref, as described above, the oscillation frequency of the ring oscillator 23 is gradually decreased or increased in accordance with an amount of the charge leakage.

As discussed earlier, in the conventional charge pump circuit having the single oscillation period or the dual oscillation period, the charge pump 104 is driven by one or two fixed oscillation frequencies in accordance with the charge consumption (existence of the charge consumption). However, in accordance with the present invention, the charge pump 204 is driven by varying the oscillation frequency pursuant to the amount of the charge consumption, not the existence of the charge consumption.

FIG. 5 illustrates a simulation result of charge pumping efficiency in accordance with the oscillation frequency. Here, iboot indicates a consumption current by Vboot, and a pumping capacitance of 500 pF is employed for simulation. As shown in FIG. 5, the conventional oscillation frequency is always fixed to have a value f1 indicating a maximal efficiency Emax in the active mode. However, in case the oscillation frequency exceeds f1, in accordance with the present invention, the oscillation frequency is varied from the maximal efficiency Emax to a minimal efficiency ¾Emax having the oscillation frequency of f2.

Figure 6:
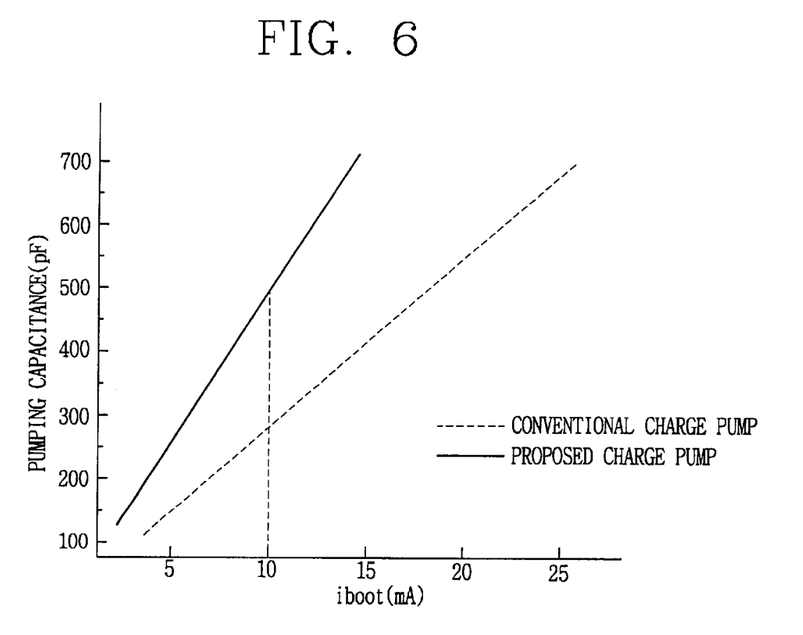
FIG. 6 illustrates a simulation result of a pumping capacitance in accordance with a consumption current in the conventional art and the present invention.

In addition, FIG. 6 illustrates a simulation result of the pumping capacitance in accordance with the consumption current iboot. Here, the simulation is performed in the active mode in consideration of the current leakage and the current consumption. Referring to FIG. 6, in order to generate the current iboot of 10 mA, the pumping capacitance used in the conventional charge pump 106 is approximately a double of the pumping capacitance used in the charge pump 204 in accordance with the present invention. As a result, considering that a ratio of the pumping capacitance in the charge pump is generally 40%, a size of the charge pump according to the present invention is reduced approximately by 20%, as compared with the conventional art.

Figure 7:
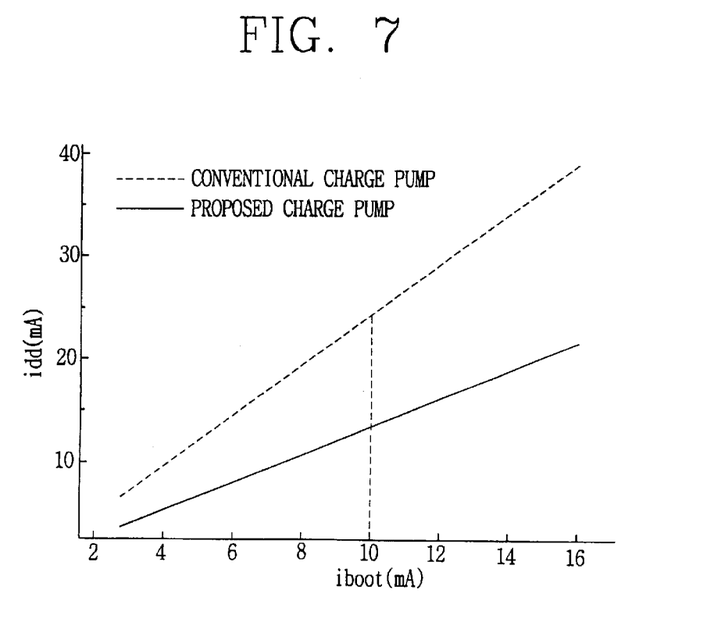
FIG. 7 illustrates a simulation result of a supply current in accordance with the consumption current in the conventional art and the present invention.

FIG. 7 illustrates a simulation result of a supply current idd in accordance with an increase of the consumption current iboot. As shown in FIG. 6, when the consumption current iboot is 10 mA, the pumping capacitance of 520 pF is required in the conventional art, but the pumping capacitance of 270 pF is necessary in the present invention. In addition, as depicted in FIG. 5, when the oscillation frequency is maintained to be lower than f2 in the standby mode, in accordance with the present invention, the consumption of the supply current idd in the charge pump 204 is reduced approximately by 45%, as compared with the conventional art. Accordingly, since the oscillation frequency is varied pursuant to the charge consumption amount of the charge pump 204, the size of the pumping capacitance and the consumption of the supply current idd can be remarkably reduced. That is, when the pumping capacitance of 270 pF is identically employed, the present invention can improve the pumping efficiency of the charge pump 204 by 80%, as compared with the conventional art.

As described above, the present invention can reduce the size of the pumping capacitance and the power consumption by varying the pumping period of the charge pump in proportion to the amount of the charge consumption.

Moreover, since the pumping period is varied according to the charge consumption amount, the level of the boosting voltage is not dropped due to the unexpected charge consumption (current leakage) in the standby mode. Consequently, when the standby mode is changed to the active mode, the present invention can rapidly restore the pumping voltage to a wanted boosting voltage level.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A charge pump circuit having a variable oscillation period, comprising:
   a voltage divider for dividing a boosting voltage to a predetermined level;
   a voltage level sensing unit for sensing a voltage difference between a divided voltage from the voltage divider and a reference voltage, and for outputting a control voltage corresponding to the sensed voltage difference;
   an oscillator circuit for varying an oscillation frequency of a pulse signal in accordance with the control voltage outputted from the voltage level sensing unit; and
   a charge pump for performing a pumping operation in accordance with the pulse signal from the oscillator circuit, and for outputting the boosting voltage, wherein the oscillator circuit comprises,
      a current source for generating a reference current in accordance with the control voltage from the voltage level sensing unit,
      a plurality of current mirrors including first to fifth current mirrors each connected to the current source to output first to fifth source currents,
      a ring oscillator including a first to the fifth inverters each connected between a corresponding one of the current mirrors and a ground to vary the oscillation frequency in accordance with a corresponding one of the first to fifth source currents, and
      an output buffer for buffering an output from the ring oscillator, and for outputting the pulse signal.

2. The charge pump circuit according to claim 1, wherein the voltage level sensing unit is a differential amplifier.

3. The charge pump circuit according to claim 1, wherein the current source is an n-channel MOSFET, and wherein the inverters of the ring oscillator are individually controlled by the current mirrors.

4. The charge pump circuit according to claim 3, wherein the oscillator circuit comprises:
   a first transistor connected in series to the current source having a source electrode connected to a power voltage terminal, wherein the current source is a reference transistor having a gate electrode receive the control voltage;
   a second transistor having a drain electrode connected to the first inverter, a gate electrode and a source electrode respectively connected to the gate electrode and the source electrode of the first transistor;
   a third transistor having a drain electrode connected to the second inverter, a gate electrode and a source electrode respectively connected to the gate electrode and the source electrode of the first transistor;
   a fourth transistor having a drain electrode connected to the third inverter, a gate electrode and a source electrode respectively connected to the gate electrode and the source electrode of the first transistor;
   a fifth transistor having a drain electrode connected to the fourth inverter, a gate electrode and a source electrode respectively connected to the gate electrode and the source electrode of the first transistor; and
   a sixth transistor having a drain electrode connected to the fifth inverter, a gate electrode and a source electrode respectively connected to the gate electrode and the source electrode of the first transistor.

5. The charge pump circuit according to claim 4, wherein dimensions of the second through sixth transistors control the source current of each of the first to fifth current mirrors, respectively.

6. The charge pump circuit according to claim 4, wherein the first to sixth MOSFETS are p-channel MOSFETs, and a driving current of the second to sixth MOSFETs are substantially equal and determined by the first MOSFET.

7. The charge pump circuit according to claim 1, wherein the output buffer is an inverter for inverting an output from the fifth inverter in accordance with an output from the third inverter, wherein the output buffer comprises first to fourth transistors connected in series between the power supply voltage and the ground, wherein gates of the first and fourth transistors receive the output from the third inverter.

8. An oscillator circuit having a variable oscillation period, comprising:
   a voltage level sensing unit for comparing a boosting voltage divided by a predetermined level with a reference voltage, and for outputting a control voltage corresponding to a charge consumption amount of a charge pump;
   a current source for generating a reference current in accordance with the control voltage;
   plurality of current mirror means connected to a power supply voltage for current-mirroring the reference current, and for outputting a plurality of source currents;
   ring oscillator means having a plurality of more than two stages each connected between a corresponding one of the current mirror means and a ground, wherein each of the ring oscillator means stages is individually controlled by a corresponding source current from the corresponding one current mirror means to vary an oscillation frequency of a pulse signal; and
   output buffer means for buffering the pulse signal of the ring oscillator means, and for outputting a pulse signal for a pumping operation of the charge pump.

9. The oscillator circuit according to claim 8, wherein the voltage level sensing unit is a differential amplifier, wherein the output buffer means comprises first to fourth transistors connected in series between the power supply voltage and the ground, wherein gates of the first and the fourth transistors receive an output signal from a prescribed stage of the ring oscillator means.

10. The oscillator circuit according to claim 8, wherein the current source is an n-channel MOSFET.

11. The oscillator circuit according to claim 8, wherein the plurality of current mirror means each comprises a pair of p-channel MOSFETs, a drain of the first MOSFET being connected to the current source, and a drain of the other MOSFET being respectively connected to a power source terminal of the corresponding stage of the ring oscillator means.

12. The oscillator circuit according to claim 11, wherein a driving current of the second to sixth MOSFETs is determined by the first MOSFET.

13. The oscillator circuit according to claim 8, wherein the ring oscillator comprises a first to the fifth inverters composing a ring, and the output buffer is a clocked inverter for inverting an output from the fifth inverter in accordance with an output from the third inverter.

14. The oscillator circuit according to claim 9, wherein each inverter comprises an n-channel MOSFET and a p-channel MOSFET, and the clocked inverter comprises two p-channel MOSFETs and two n-channel MOSFETs which are connected in series between the power supply voltage and the ground.

15. The oscillator circuit according to claim 11, wherein the dimensions of the other MOSFET of the pair of MOSFETs determine the source current of each of the plurality of current mirror means, respectively.

16. The oscillator circuit of claim 8, wherein the voltage level sensing circuit, comprises:
- a voltage divider for dividing the boosting voltage to a predetermined level; and
- a differential amplifier for amplifying a voltage difference between the divided voltage from the voltage divider and the reference voltage, and for outputting the control voltage corresponding to the amplified voltage difference.

* * * * *